US009317330B2

(12) United States Patent
Duttagupta et al.

(10) Patent No.: US 9,317,330 B2
(45) Date of Patent: Apr. 19, 2016

(54) SYSTEM AND METHOD FACILITATING PERFORMANCE PREDICTION OF MULTI-THREADED APPLICATION IN PRESENCE OF RESOURCE BOTTLENECKS

(71) Applicant: Tata Consultancy Services Limited, Mumbai, Maharshtra (IN)

(72) Inventors: Subhasri Duttagupta, Mumbai (IN); Rupinder Singh Virk, Mumbai (IN); Manoj Karunakaran Nambiar, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 102 days.

(21) Appl. No.: 14/183,461

(22) Filed: Feb. 18, 2014

(65) Prior Publication Data

US 2015/0150020 A1   May 28, 2015

(30) Foreign Application Priority Data

Nov. 25, 2013   (IN) .......................... 3699/MUM/2013

(51) Int. Cl.
*G06F 9/50* (2006.01)
*G06N 5/04* (2006.01)
(Continued)

(52) U.S. Cl.
CPC .............. *G06F 9/5011* (2013.01); *G06F 9/466* (2013.01); *G06F 11/3447* (2013.01);
(Continued)

(58) Field of Classification Search
CPC ............ G06F 11/3409; G06F 11/3452; G06F 11/3466; G06F 11/3447; G06F 9/52; G06F 9/5015; G06F 9/4881
USPC ......................................... 718/104
See application file for complete search history.

(56) References Cited

U.S. PATENT DOCUMENTS 6,061,709 A    5/2000 Bronte
6,314,463 B1 * 11/2001 Abbott et al. ................. 709/224
(Continued)

FOREIGN PATENT DOCUMENTS

EP        2524308 A2    11/2012
JP        4453823 B2     4/2010
JP     2010250689 A    11/2010

OTHER PUBLICATIONS

Subhasri Duttagupta et al., "Performance Extrapolation using Load Testing Results" IJSSST, vol. 13, No. 2. (pp. 72-80).
(Continued)

*Primary Examiner* — Li B Zhen
*Assistant Examiner* — Daniel Wei
(74) *Attorney, Agent, or Firm* — Finnegan, Henderson, Farabow, Garrett & Dunner, L.L.P.

(57) ABSTRACT

The present disclosure generally relates to a system and method for predicting performance of a multi-threaded application, and particularly, to a system and method for predicting performance of the multi-threaded application in the presence of resource bottlenecks. In one embodiment, a system for predicting performance of a multi-threaded software application is disclosed. The system may include one or more processors and a memory storing processor-executable instructions for configuring a processor to: represent one or more queuing networks corresponding to resources, the resources being employed to run the multi-threaded application; detect, based on the one or more queuing networks, a concurrency level associated with encountering of a first resource bottleneck; determine, based on the concurrency level, performance metrics associated with the multi-threaded application; and predict the performance of the multi-threaded application based on the performance metrics.

13 Claims, 8 Drawing Sheets

(51) Int. Cl.
*G06F 9/46* (2006.01)
*G06F 11/34* (2006.01)

(52) U.S. Cl.
CPC .......... *G06N 5/048* (2013.01); *G06F 11/3409* (2013.01); *G06F 11/3419* (2013.01); *G06F 11/3433* (2013.01); *G06F 2201/865* (2013.01)

(56) References Cited

U.S. PATENT DOCUMENTS

| | | | |
|---|---|---|---|
| 6,738,386 B1* | 5/2004 | Holmqvist | 370/412 |
| 7,757,214 B1 | 7/2010 | Palczak et al. | |
| 8,387,059 B2 | 2/2013 | Chang et al. | |
| 2007/0157200 A1* | 7/2007 | Hopkins | 718/100 |
| 2008/0133435 A1* | 6/2008 | Chintalapti et al. | 706/12 |
| 2009/0300173 A1 | 12/2009 | Bakman et al. | |
| 2011/0172963 A1* | 7/2011 | Gu et al. | 702/182 |

OTHER PUBLICATIONS

Cornel Barna et al., "Autonomic Load-Testing Framework" ICAC'11, Jun. 14-18, 2011, Karlsruhe, Germany. http://www2.ic.uff.br/~boeres/slides_AP/papers2012_2/AutonomicLoadFrameworkp91-barna.pdf (pp. 91-100).

Qingyang Wang et al., "An Experimental Study of Rapidly Alternating Bottlenecks in n-Tier Applications" 2013 IEEE Sixth International Conference on Cloud Computing, IEEE Computer Society, (pp. 171-178).

Simon Malkowski, et al. "Bottleneck Detection Using Statistical Intervention Analysis" A. Clemm, L.Z. Granville, and R. Stadler (Eds.): DSOM 2007, LNCS 4785, pp. 11-23, 2007.

Jens Happe et al, "Facilitating performance predictions using software components" Software, IEEE (vol. 28, Issue: 3), 2011, http://www.koziolek.de/docs/Happe2011-IEEE-SW-preprint.pdf (11 pages).

Tertilt Daniel et al., "Generic performance prediction for ERP and SOA applications" 2011.

* cited by examiner

Software Queuing Network

SYSTEM AND METHOD FACILITATING PERFORMANCE PREDICTION OF MULTI-THREADED APPLICATION IN PRESENCE OF RESOURCE BOTTLENECKS

PRIORITY CLAIM

This U.S. patent application claims priority under 35 U.S.C. §119 to: India Application No. 3699/MUM/2013, filed Nov. 25, 2013. The aforementioned application is incorporated herein by reference in its entirety.

TECHNICAL FIELD

The present disclosure generally relates to a system and method for predicting performance of a multi-threaded application, and particularly, to a system and method for predicting performance of the multi-threaded application in the presence of resource bottlenecks.

BACKGROUND

In a typical multi-tier enterprise system, a software application may be accessed by a large number of users. Due to the large number of users, the probability of resource bottlenecks can increase significantly. Presence of the resource bottlenecks typically hampers performance of the software application. The bottleneck may occur to either software resources or hardware resources. To increase the scalability of the multi-tier enterprise system, detecting of the resource bottlenecks may be required while the software application is being tested.

Many of the multi-tier enterprise systems have employed various methods to identify the resource bottlenecks because the resource bottlenecks may limit the overall performance of the multi-tier enterprise system. Resource bottlenecks may be identified if the resource bottlenecks occur during the performance testing or at a very late stage in a production environment. For example, discrete event simulation modeling is one of the well-known approaches for predicting performance of the software application. However, the development of such simulation model can be a time consuming process.

SUMMARY

This summary is provided to introduce aspects related to system(s) and method(s) for predicting performance of a multi-threaded application in the presence of resource bottlenecks and the aspects are further described below in the detailed description. This summary is not intended to identify essential features of the claimed subject matter nor is it intended for use in determining or limiting the scope of the claimed subject matter.

In one embodiment, a system for facilitating identification of an informative segment from a data is provided. The system may include one or more processors and a memory storing processor-executable instructions comprising instructions to: represent one or more queuing networks corresponding to resources, the resources being employed to run the multi-threaded software application; detect, based on the one or more queuing networks, a concurrency level associated with encountering of a first resource bottleneck, wherein the concurrency level is detected by checking a number of threads accessing the multi-threaded software application; determine, based on the concurrency level, a performance metrics associated with the multi-threaded application; and predict the performance of the multi-threaded application based on the performance metrics.

In one embodiment, a method for predicting performance of a multi-threaded software application is disclosed. The method may be performed by a processor using programmed instructions stored in a memory. The method may comprise: representing, one or more queuing networks corresponding to resources, the resources being employed to run the multi-threaded software application; detecting, by one or more processors and based on the one or more queuing networks, a concurrency level associated with encountering of a first resource bottleneck; wherein the concurrency level is detected by checking a number of threads accessing the multi-threaded software application determining, based on the concurrency level, a performance metrics associated with the multi-threaded application; and predicting the performance of the multi-threaded application based on the performance metrics.

In one embodiment, a non-transitory computer program product having embodied thereon a computer program instructions to for predicting performance of a multi-threaded software application is disclosed. The computer program stores instructions. The instructions may comprise instructions for: representing, one or more queuing networks corresponding to resources, the resources being employed to run the multi-threaded software application; detecting, by one or more processors and based on the one or more queuing networks, a concurrency level associated with encountering of a first resource bottleneck, wherein the concurrency level is detected by checking a number of threads accessing the multi-threaded software application; determining, based on the concurrency level, a performance metrics associated with the multi-threaded application; and predicting the performance of the multi-threaded application based on the performance metrics.

BRIEF DESCRIPTION OF DRAWINGS

The detailed description is described with reference to the accompanying drawings. The accompanying drawings, which are incorporated in and constitute a part of this disclosure, illustrate exemplary embodiments and, together with the description, serve to explain the disclosed principles.

DETAILED DESCRIPTION

While aspects of described systems and methods for predicting performance of a multi-threaded application in the presence of resource bottlenecks may be implemented in any number or types of different computing systems, environments, and/or configurations, the embodiments are described in the context of the following exemplary system.

Figure 1:
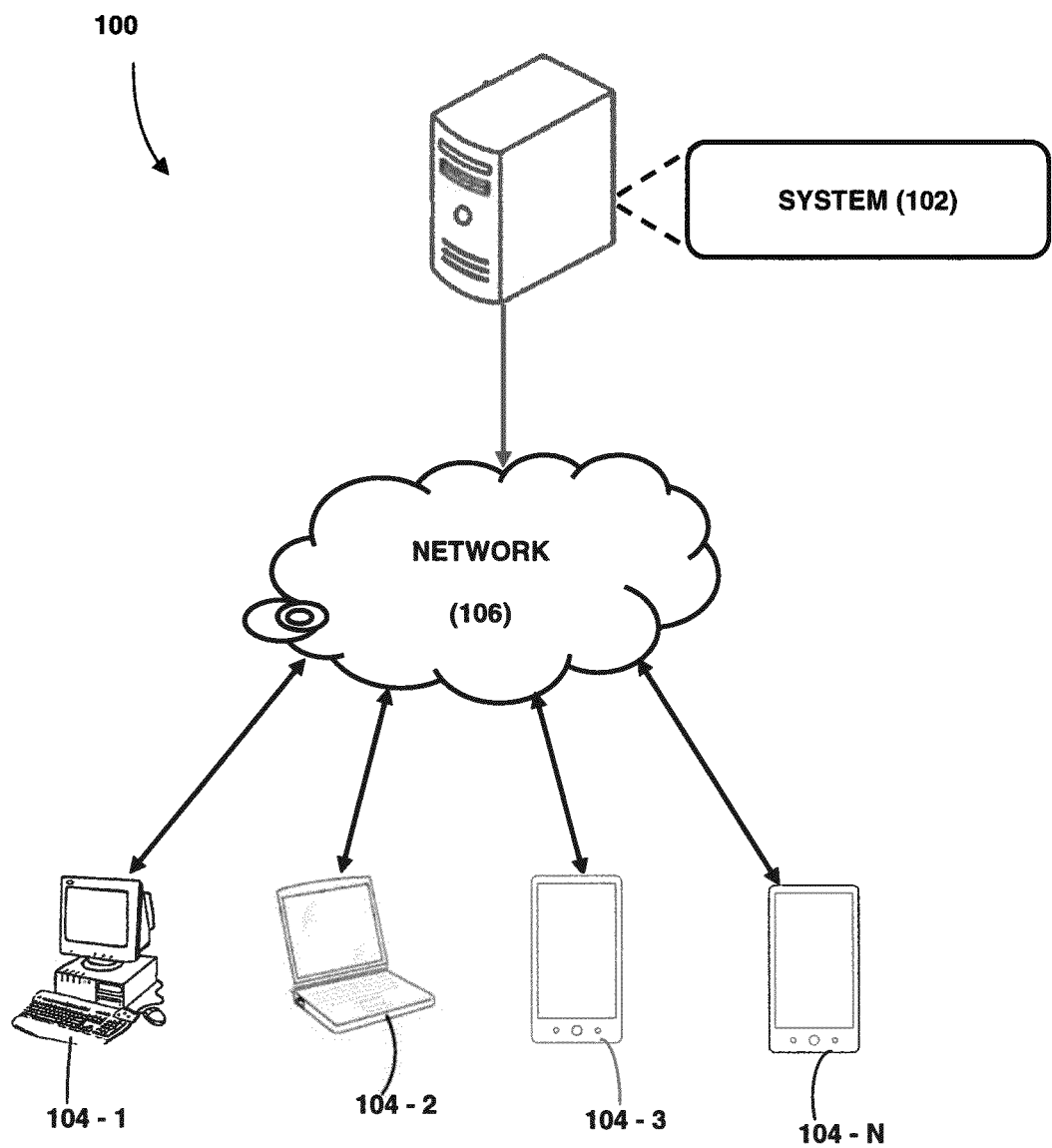
FIG. 1 illustrates an exemplary network environment including a system for predicting performance of a multi-threaded application in the presence of resource bottlenecks, in accordance with an embodiment of the present subject matter.

Referring to FIG. 1, a network environment 100 comprises a system 102 for predicting performance of a multi-threaded application in the presence of resource bottlenecks. In some embodiments, the system 102 may represent multiple queuing networks. The multiple queuing networks may comprise a hardware queuing network and a software queuing network. The queuing networks may be used to detect a concurrency level at which resource bottlenecks are encountered while the multi-threaded application is being accessed. The concurrency is detected by checking number of threads accessing the multi-threaded software application. By using a pre-determined service demand value, a performance metrics may be computed. The performance metrics may include one or more parameters. The one or more parameters may predict the performance of the multi-threaded application.

Although the present subject matter describes system 102 as implemented by an application on a server, it is appreciated that the system 102 may also be implemented in a variety of computing systems, such as a laptop computer, a desktop computer, a notebook, a workstation, a mainframe computer, a server, a network server, etc. In one embodiment, the system 102 may be implemented in a cloud-based environment. It is appreciated that the system 102 may be accessed by one or more users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 may be communicatively coupled to the system 102 through a network 106.

In one implementation, the network 106 may be at least one of a wireless network or a wired network. The network 106 can be implemented as one or more types of networks, such as intranet, local area network (LAN), wide area network (WAN), the Internet, etc. The network 106 may be a dedicated network or a shared network. A shared network may represent an association of various types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network 106 may include a variety of network devices, including routers, bridges, servers, computing devices, storage devices, etc.

Figure 2:
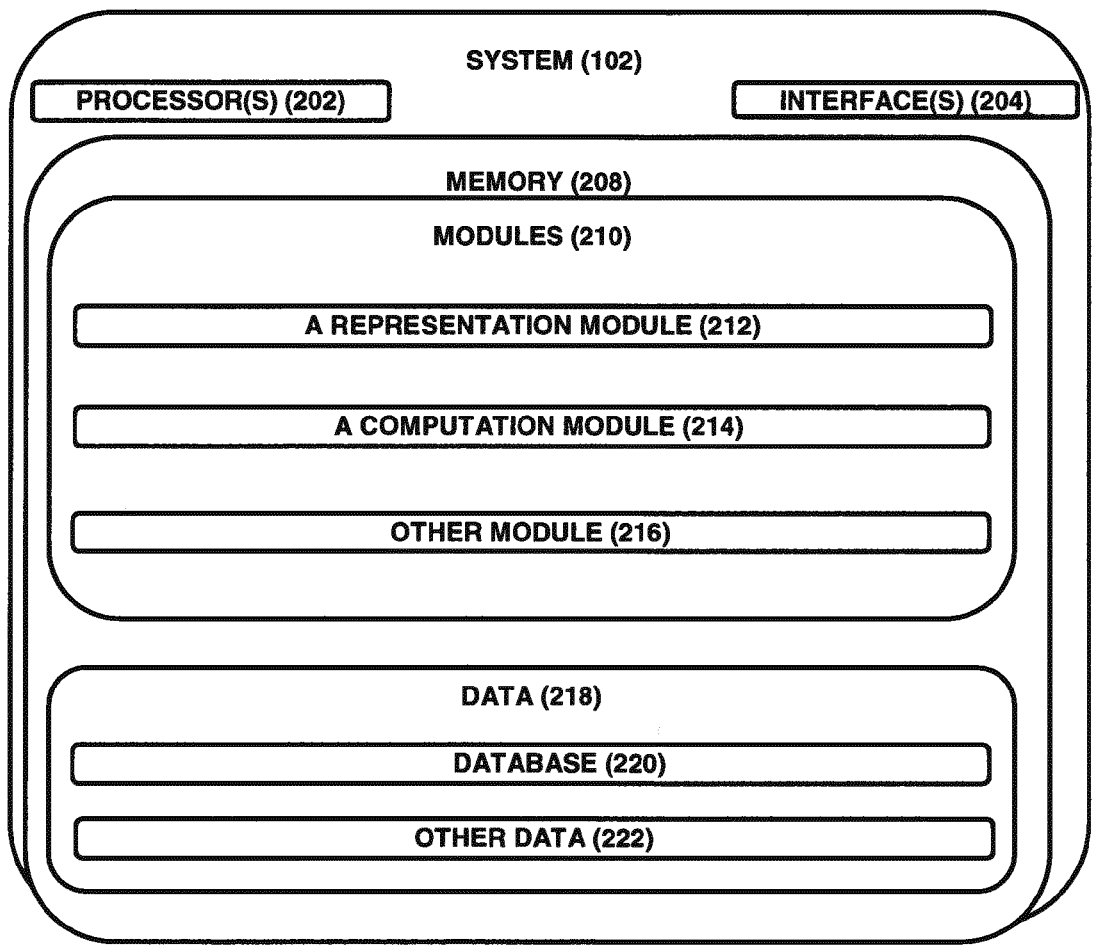
FIG. 2 illustrates an exemplary system for predicting performance of a multi-threaded application in the presence of resource bottlenecks, in accordance with an embodiment of the present subject matter.

FIG. 2 illustrates system 102 in accordance with an embodiment of the present subject matter. In one embodiment, the system 102 may include at least one processor 202, an input/output (I/O) interface 204, and a memory 208. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 208.

The I/O interface 204 may include a variety of software and hardware interfaces, for example, a web interface, a graphical user interface, etc. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks (e.g., LAN, cable networks, etc.) and wireless networks (e.g., WLAN, cellular networks, and/or satellite networks). The I/O interface 204 may include one or more ports for connecting a number of devices to one another or to another server.

The memory 208 may include any computer-readable medium known in the art including, for example, volatile memory (e.g., static random access memory (SRAM) and dynamic random access memory (DRAM)) and/or non-volatile memory (e.g., read only memory (ROM), erasable programmable ROM, flash memories, hard disks, optical disks, and magnetic tapes). The memory 208 may include modules 210 and data 218.

The modules 210 may include routines, programs, objects, components, data structures, etc. The modules 210 may perform particular tasks, functions and/or implement particular abstract data types. In one implementation, the modules 210 may include are presentation module 212 and a computation module 214. The other modules 216 may include programs or coded instructions that supplement applications and functions of the system 102.

The data 218, in some embodiments, may serve as a repository for storing data processed, received, and generated by one or more of the modules 210. The data 218 may also include a database 220 and other data 222. The other data 222 may include data generated as a result of the execution of one or more modules in the other module 216.

The present disclosure relates to a system(s) and method(s) for predicting performance of multi-threaded application in the presence of resource bottlenecks. One or more software queuing networks and one or more hardware queuing networks may be used to detect presence of any bottleneck while the application is being accessed. A predetermined service value may be used to determine a performance metrics. One or more parameters of performance metrics (e.g., throughput of the multi-threaded application, response time, utilization of individual resources, etc.) may predict the performance of the multi-threaded application.

The queuing networks represented by the representation module 212 may refer to analytical models. Analytical models are mathematical approximations of a real world system and may be used to predict certain behaviors of one or more systems being modeled. The queuing network (or queuing models) received and used here may predict behavior of the multi-threaded application in terms of different performance related measures (e.g., performance metrics). These performance related measures may include, but are not limited to, an expected waiting time. The expected waiting time refers to the time that a given object will spend within a queue before it may be processed. The performance related measures may further include an expected number of objects within a queue at a particular time, a probability that any queue will be empty, a time to service for a particular type of object, etc.

Analytical models (e.g., queuing models or queuing networks) may be frequently used to predict whether a particular system (e.g., a multi-threaded application) will be able to meet established quality of service metrics, such as response time.

The systems and methods of the present disclosure may predict performance of a multi-threaded application being accessed by multiple users. The multi-threaded application may be divided into a critical section and a non-critical section. A section of code that may be executed by only one of many concurrent threads may be referred to as the critical section. In general, an access to a critical section is controlled by a lock or semaphore. A remaining section of the multi-threaded application that may be executed simultaneously by any number of concurrent threads may be referred to as the non-critical section.

The resource bottlenecks may occur either due to hardware resources of software resources. The system of the present disclosure (e.g., the system 102) may facilitate in finding the number of users accessing the multi-threaded application when a first bottleneck is encountered. The first bottleneck may occur either due to hardware resource limitation or software resource constraint. The multi-threaded applications may have synchronous or asynchronous message communications.

In some embodiments, the system 102 may take following exemplary presumptions while predicting performance of the multi-threaded application. For example, the presumptions may include that the system 102 is in steady state, that the analysis of access of the multi-threaded application does not hold good for any transient behavior of the system, that all waiting for a software resource is implemented only through explicit synchronization constructs, and that the multi-threaded application may have a number of critical sections but it may have only one non-critical section. The non-critical section may represent entire portion of the code without any critical sections.

As a non-limiting example, the multi-threaded application may include applications written in programming languages with explicit synchronization constructs as in C, C++, and/or Java. In applications written in programming languages, it is possible to know exact portion of the code that is synchronized.

The memory 208 may store the representation module 212 configured to represent queuing networks for resources employed to run the multi-threaded application. The queuing networks may be formed to model contention for software and hardware resources. The queuing networks may be formed to detect a concurrency level at which resource bottlenecks (e.g., the first resource bottleneck) may be encountered while accessing the multi-threaded application.

The representation module 212 may represent hardware queuing network and software queuing network. The hardware queuing network may represent some or all hardware resources. The hardware resources may comprise of a CPU (Central Processing Unit), a memory, a disk or a combination thereof. The software queuing network may represent software modules corresponding to critical and non-critical sections. The software resources may include software modules.

In the queuing networks, users may be represented as customers and referred to as threads. The software queuing network may include two types of software resources: delay resources and queuing resources. The delay resource may correspond to the non-critical section (NCS) code. As in non-critical section, there may be no contention that neither queuing happens before executing the software module. The queuing resources may correspond to critical sections (CS), which may be delimited by synchronization constructs. The multi-threaded application may have any number of critical sections. The software queuing network (SQN) can include, for example, a non-critical section and a number of critical sections.

While a thread (e.g., the user) is using a software resource, it may also use physical resources such as CPUs and disks. The queuing network associated with the physical resources is called hardware queuing network (HQN). Thus users in the HQN may be users that are using the physical resources because of the execution of software modules.

Figure 3:
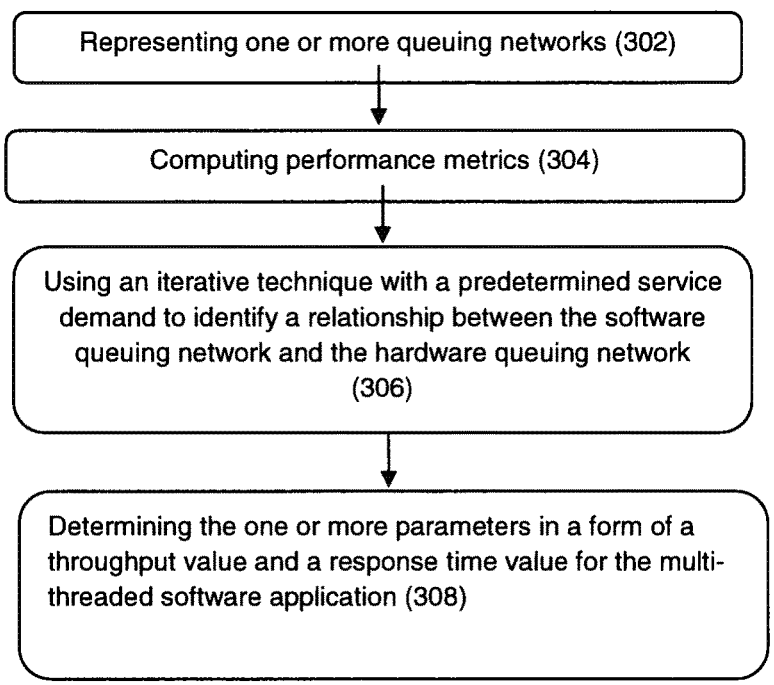
FIG. 3 illustrates an exemplary method for predicting performance of a multi-threaded application in the presence of resource bottlenecks, in accordance with an embodiment of the present subject matter.

FIG. 3 illustrates an exemplary method 300 for predicting performance of a multi-threaded application in the presence of resource bottlenecks, in accordance with an embodiment of the present subject matter. FIG. 3 will be further described below.

Figure 4:
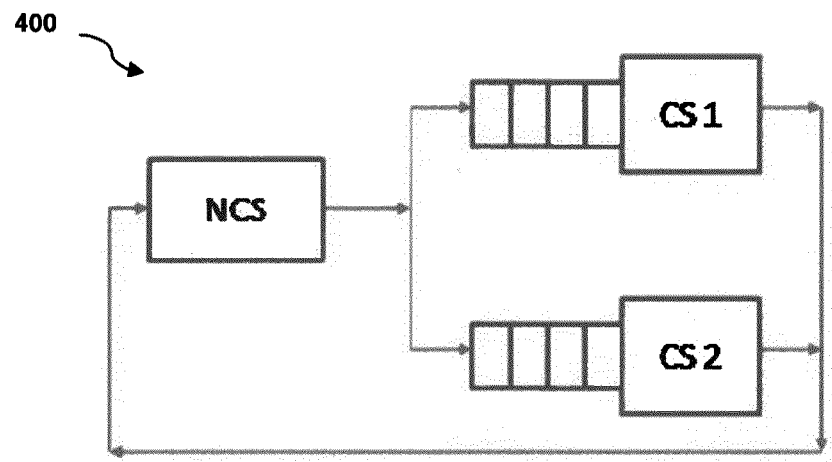
FIG. 4 is a diagram illustrating an exemplary software queuing network including a non-critical section and two critical section components, in accordance with an embodiment of the present subject matter.
Figure 4:
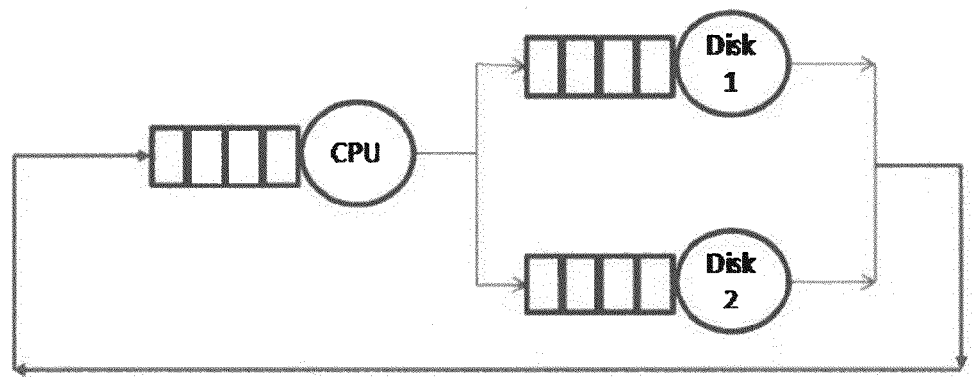

FIG. 4 is a diagram 400 illustrates an exemplary software queuing network including a non-critical section and two critical section components. All software modules are represented using rectangles whereas all servers are represented using circles. In an HQN, users can access one CPU server and any of the two disk servers. In a two-layer queuing network, the time spent in the non-critical and critical sections may depend on the contention at the physical resources, e.g., CPU and disk. In a two-layer queuing network, the number of users in the hardware queuing network (e.g., the number of users who contend for the physical resources), may equal the number of concurrent threads that are not blocked waiting to enter a critical section. Because blocked threads are sleeping, they are not present in the HQN queue.

With reference to FIG. 4, to reduce complexity, presumptions may be made. As a non-limiting example, hardware resources (e.g., CPU and disk) may be considered with the assumption that within critical sections, only computation and IO operations are performed and no message communication takes place.

The computation module 214 may be configured to compute performance metrics for the multi-threaded application. The computation of the performance metrics may include solving the software queuing network and the hardware queuing network by using an iterative technique with a predetermined service demand. The performance metrics may include one or more parameters. The one or more parameters may predict performance of the multi-threaded application in the presence of resource bottlenecks.

The computation module 214 may use the predetermined service demand to develop a relationship between the software queuing network and the hardware queuing network. The relationship comprises utilization or sharing of the software resources with respect to the hardware resources with respect to the predetermined value of the service demand.

The computation module 214 may execute a mean value analysis theorem (methodology) as the iterative technique on the predetermined service demand. The mean value analysis theorem may be used to derive performance characteristics in form of the performance metrics.

The computation module 224 may execute the mean value analysis theorem to estimate the performance of the multi-threaded application in the presence of N concurrent users. In some embodiments, while solving the queuing networks, presumptions may be made. For example, a presumption may include that the predetermined service demand of all the hardware resources at each of the tiers of a multi-tiered application is captured. The pre-determined service demand of a hardware resource (e.g., a CPU) for a software module may refer to the amount of CPU time required to execute the specific module. A presumption may also include that the predetermined service demand of all the synchronization events is captured. This may be achieved through instrumentation of the synchronization constructs used by the application. The synchronization events may include, for example, synchronized methods, block of code with synchronized keyword, barriers, acquiring followed by releasing of a lock, and/or conditional variables. A method belonging to a class may be declared synchronized. A block of code may be prefixed by a keyword synchronize to mark it as a synchronized section. With respect to a barrier, if a thread arrives at the barrier, the thread will wait until some or all other threads arrive that point of synchronization. In case of a condition variable, a thread may wait until another thread calls a signal on the same condition variable.

In some embodiments, it may be further assumed that there are only two modules in the software layer. The two modules may correspond to a critical section and a non-critical section. In one embodiment, the CPU demands of the critical section and the non-critical section may be denoted by $D_{CS,CPU}$ and $D_{NCS,CPU}$, respectively. The total CPU service demand may be obtained by adding the CPU demand of the critical section and the CPU demand of the non-critical section. The total CPU service demand may be used in the hardware queuing network. Formula 1a illustrates the determination of the total CPU service demand denoted by $D_{CPU}$.

$$D_{CPU} = D_{CS, CPU} + D_{NCS, CPU} \tag{1a}$$

In some embodiments, in a multi-core machine with C cores, a critical section may be executed on only one core at a time, whereas a non-critical section may be executed on any number of cores. Hence, the total CPU service demand for hardware queuing network may be modified as illustrated in formula 1b.

$$D_{CPU} = D_{CS, CPU} + D_{NCS, CPU}/C \tag{1b}$$

Further, during the execution in the critical section, a thread may also access disk for doing one or more read and/or write operation. Thus, the demand of a critical section and a non-critical section may include demands associated with, for example, a CPU and a disk. The total resource demand of a critical section may be denoted by $D_{CS}$ and may include the demands associated with a CPU and a disk. Formula 2 illustrates the determination of the total resource demand.

$$DCS = DCS,CPU + DCS,Disk \tag{2}$$

Similar relationship may exist for service demand of non-critical section. The computation module 214 may also consider a residence time. The residence time is a total time spent by a thread at a physical resource and may be denoted by $R_{CPU}$ (for CPU) or $R_{Disk}$ (for disk).

In some embodiments, the following steps may be performed by the computation module 214 while executing the mean value analysis theorem.

The computation module 214 may be configured to use the pre-determined service demand of the critical section and the non-critical section and to save initial values of the corresponding service demands as $D^i_{CS, CPU}$ and $D^i_{NCS, CPU}$. The computation module 214 may also be configured to denote the number of blocked threads at the critical section (CS) as $B^i_{CS}$ and initialize $B^i_{CS}$ to zero.

The computation module 214 may be configured to solve the software queuing network with the pre-determined service demands of all critical sections and non-critical sections. The number of customers (e.g., users or threads) in the software layer may be the same as the number of users in the access system.

The computation module 214 may be configured to obtain the number of threads blocked at the critical section denoted by $B_{CS}$. The computation module 214 may also be configured to retain the number of threads blocked at the critical section for comparing it with the number of blocked threads in the next iteration.

In a next step, the number of customers in the hardware queuing network may be taken as the number of threads which are not blocked at the critical section ($N-B_{CS}$). The computation module 214 may be configured to solve the hardware queuing network and obtain the residence time at each of the hardware resources such as $R_{CPU}$ or $R_{Disk}$.

The computation module 214 may be configured to update the pre-determined service demand of the software modules to reflect the waiting for hardware resources as illustrated in the following formulas (2a) and (2b).

$$D_{CS, CPU} = R_{CPU} * D^i_{CS, CPU} / (D^i_{CS, CPU} + D^i_{NCS, CPU}) \tag{2a}$$

$$D_{NCS, CPU} = R_{CPU} * D^i_{NCS, CPU} / (D^i_{CS, CPU} + D^i_{NCS, CPU}) \tag{2b}$$

Thus, the service demand of the critical section may be iteratively adjusted to account for resource contention at the hardware resources.

The computation module 214 may also be configured to check whether $D_{CS, CPU} < D^i_{CS, CPU}$. This step may prevent the critical section demand to be lower than the initial demand. If critical section demand is lower than the initial demand, then the final solution may be obtained.

The computation module 214 may find a difference between the number of blocked threads at the critical section in the current iteration $B_{CS}$ and in the previous iteration $B_{iCS}$. If the difference between $B_{CS}$ and $B_{iCS}$ is less than a specific limit or a predetermined value (e.g., if $|B_{CS}-B_{iCS}|<\epsilon$, where $\epsilon$ is a small number, or if $B_{iCS}>B_{CS}$), then the final solution may be obtained. Otherwise, the computation module 214 may assign $B_{iCS}=B_{CS}$ and go back to the step to again solve the software queuing network with the pre-determined service demands of all critical sections and non-critical sections. In some embodiments, epsilon (i.e., "$\epsilon$" or the predetermined value) may include a small decimal number that is less than 1. Epsilon may indicate that the error in the number of blocked threads has stabilized or converged over a number of iterations. The value of epsilon, for example, may be taken as 0.005.

The computation module 214 may compute a final throughput $X_{EST}$ value of the software queuing network and the hardware queuing network. The average response time of the individual system may be obtained using the Little's law. Under the Little's law, if N is the number of customers in the systems, X is the throughput, R is the response time, and Z is the think-time used for requests, then the relationship illustrated in the following formula 2(c) may exist.

$$N = X * (R+Z) \tag{2c}$$

Based on formula 2(c), the utilization of the CPU, the disk and any other hardware resources may be estimated. For a multi-core machine, the average CPU utilization per-core may be obtained based on the estimated throughput and the total CPU service demand as given in formula (1a). For example, the average CPU utilization per-core may be determined using formula (3).

$$U_{CPU} = (D_{CPU} \times X_{EST})/C \tag{3}$$

Based on the pre-determined service demand of all critical sections and non-critical sections, the above mean value analysis algorithm may be used to obtain the performance of the system until the throughput saturates.

In some embodiments, the system 102 may be configured to validate with multi-class requests. The multi-class requests may correspond to requests from users that are belong to multiple classes. Each class of the requests may have its own software module that may contain a critical section. In a multi-class performances prediction, two threads may be simultaneously inside their critical sections. Further, critical sections belonging to different classes may have different service demands. Further, on a multi-core machine, non-critical sections of all the classes may run simultaneously on different cores.

The system 102 may be configured to predict performance of the multi-threaded application where resource pooling is used. In the resource pooling cases, a shared resource is a pool of resources. As a non-limiting example, a pool of resources may be a database (DB) connection pool or a thread pool. A thread pool may correspond to a number of threads created by an application server to handle requests from concurrent users. At any given time, a single thread may exclusively serve a single user. Similarly, a database connection pool may correspond to a cache of database connections created to more efficiently execute commands on the database.

The pool size may indicate the maximum number of shared resources that may be used at a given time. Therefore, the maximum number of threads that may use the resource is equal to pool size. In configuring the system for predicting performance of the multi-threaded application for pooled resources, the resource pooling may be modeled as a multi-server in the software queuing network and the resource demand may correspond to that of a critical section of a single thread.

The system 102 may provide a solution for predicting the performance of the multi-threaded application in the presence of application by computing a performance metrics. In some embodiments, the solution in terms of the performance metrics may converge. The conditions under which the solution provided by the system 102 may converge can include, for example, the following three conditions. First, the predetermined service demand of the critical section may not be less than the initial service demand before going through the iterative steps. Second, after a few initial iterations, the number of the blocked threads may not decrease from the previous iterations. Third, the difference in the number of blocked threads between a new iteration and a previous iteration may be less than a small number. If the above conditions are satisfied, the computation module 214 may not perform the iterative steps and may perform a final step of computing the performance metrics.

In some embodiments, the system 102 may be configured to predict performance of the multi-threaded java program used as the multi-threaded application with critical sections. It may be assumed that the java program has a single critical section and a single non-critical section. The pre-determined service demand may have been varied for each of the sections and the scalability of the multi-threaded application with the number of users may be observed.

As an example, the results obtained for various service configurations are listed below in Table 1.

TABLE 1

Server categories for a sample application

| Server category | Features |
| --- | --- |
| High range services | 8 Core CPU 2.66 GHz Xeon with 1MB L2 cache, 8 GB Physical RAM |

TABLE 1-continued

Server categories for a sample application

| Server category | Features |
| --- | --- |
| Middle range services | Quad Core AMD Opteron CPU 2.19 GHz with 2MB L2 cache, 4 GB RAM |
| Low range services | Intel ® Core Duo CPU 2.33 GHz with 4MB Cache, 2 GB RAM |

Under some circumstances, the performance prediction may involve software modules that mainly use the CPU as the hardware resource. Under such circumstances, the software modules perform computation and no disk or network activities are performed. Three different scenarios of combinations of critical and non-critical sections may be considered. For example, in a first scenario, the critical section and non-critical section may perform similar operations such that their service demands (pre-determined service demand) are almost the same. In a second scenario, the critical section may perform twice the amount of operations as that of the non-critical section. As a result, the service demand of the critical section is more than twice of the service demand of non-critical section. In a third scenario, the non-critical section service demand may be double the amount as the service demand of critical section.

In each of the above exemplary scenarios, the java program may be accessed by concurrent users and the throughput of the java program may be observed as the concurrency is varied. The throughput may be expressed as the number of iterations completed per unit time (e.g., per second). In the iterations, the java program may execute, for example, the critical section and/or the non-critical section one or more times. The CPU may be the only hardware resource that is considered. During the test interval, the average throughput, the response time of the application, and/or the utilization of CPU may be measured. The throughput may be measured during the entire test interval and the response time may correspond to the average time for completing an iteration of the java program, which may include a critical section and a non-critical section.

Figure 5:
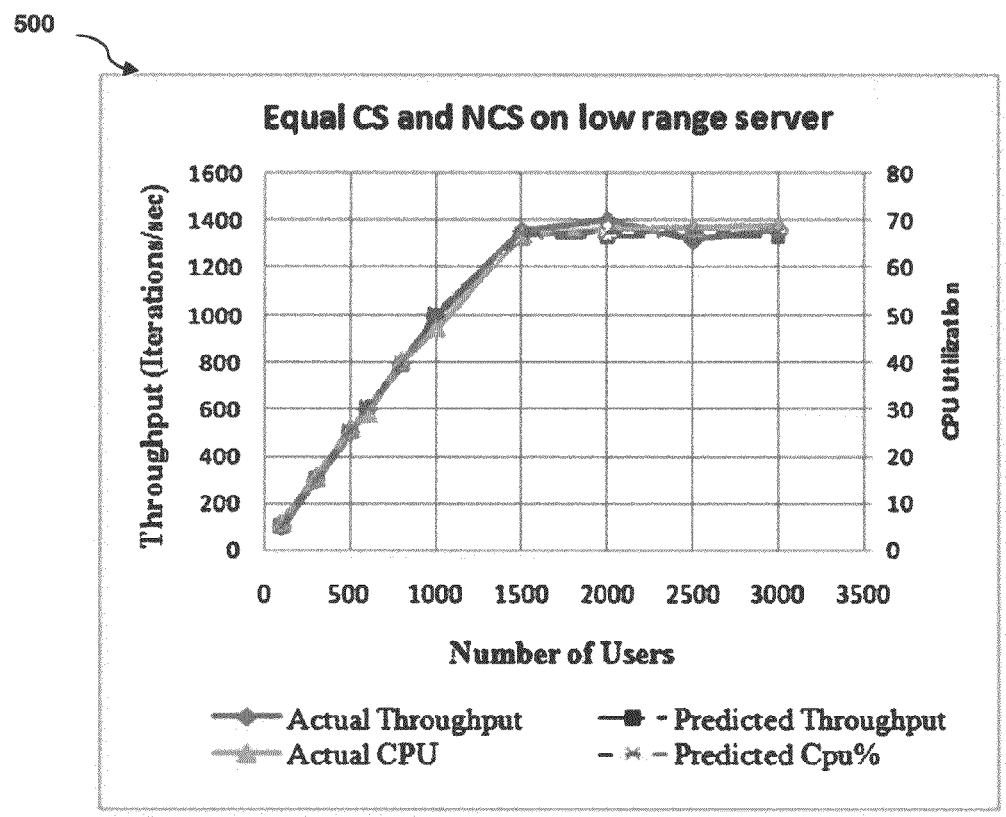
FIG. 5 is a diagram illustrating an exemplary performance metrics corresponding to a case where the critical and the non-critical sections are of the same size, in accordance with an embodiment of the present subject matter.

As a non-limiting example, FIG. 5 is a diagram 500 illustrating an exemplary performance metrics corresponding to a case where the critical and non-critical sections are of the same size. The computation module (e.g., computation module 214) may compute a performance metrics by calculating a throughput value. The throughput value may saturate due to a critical section bottleneck at, for example, 2000 users. And the average CPU utilization may not go beyond 67%. At, for example, 3000 users, the predicted throughput value may be 1327 iterations per second, while the actual throughput value may be 1360 iterations per second.

Figure 6:
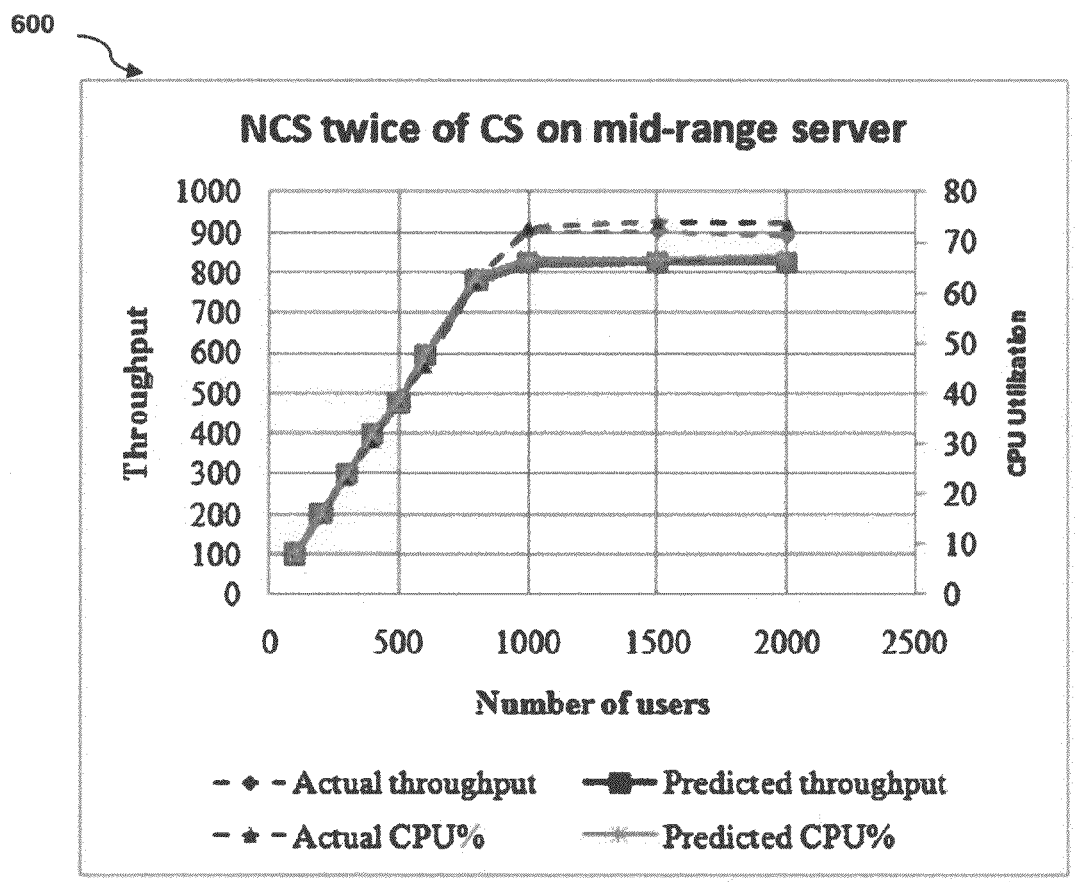
FIG. 6 is a diagram illustrating exemplary performance metrics corresponding to a case where the service demand of a non-critical section is more than twice the service demand of a critical section, in accordance with an exemplary embodiment of the present subject matter.

As another non-limiting example, FIG. 6 is a diagram 600 illustrating an exemplary performance metrics corresponding to a case where the service demand of a non-critical section is more than twice of the service demand of a critical section. Here, the threads (e.g., the users or the customers) may spend different amount of time in the critical section and in the non-critical section. For example, corresponding to scenario 3 as discussed above, on a mid-range server, the service demand of the non-critical section may be twice of the service demand of the critical section. FIG. 6 illustrates exemplary predicted and actual throughput values of the multi-threaded application and the utilization of the CPU.

As illustrated in FIG. 6, the predicted throughput may have about 10-15% differences from the actual throughput. For example, for about 2000 users, the actual throughput saturate at about 890 iterations per second and the CPU utilization is about 73%. The predicted throughput is about 825 iterations per second and the predicted CPU utilization is about 67%. The differences of the actual and predicted values may be attributed to the high service demand estimated using single user test of the application. The system may also be configured to predict performance of the multi-threaded application in situations where operations within the critical section uses the CPU and also performs I/O operations on disk.

Figure 7:
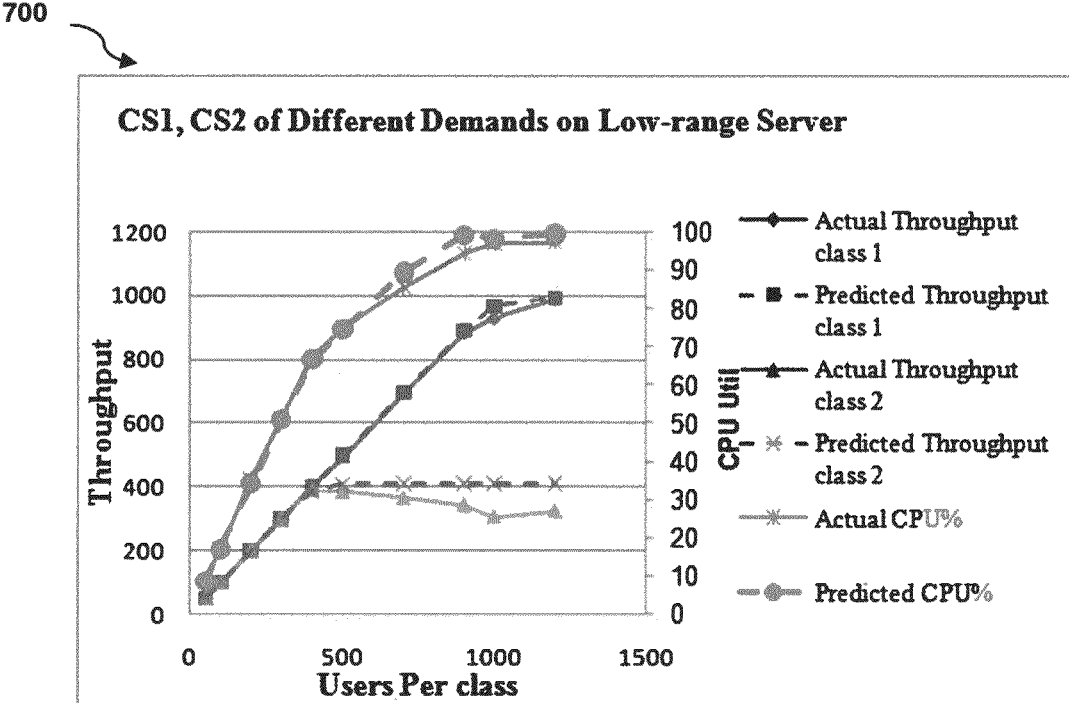
FIG. 7 is a diagram illustrating exemplary performance metrics for multi-class requests, in accordance with an exemplary embodiment of the present subject matter.

As another non-limiting example, FIG. 7 is a diagram 700 illustrating the performance prediction of the multi-threaded application where critical sections may have multi-class request. In this example, requests from users may belong to multiple classes. Moreover, each class of the requests may have its own software module that may contain a critical section. In this case, for example, only two classes of requests may be considered and the critical sections belonging to different classes may have different demands. FIG. 7 illustrates the predicted throughput for individual classes and overall CPU utilization from different requests.

As shown in FIG. 7, both the requests may use the same number of users. For example, when 500 users are accessing request of class 1, another 500 users may be accessing request of class 2. The critical section CS1 of class 1 may have a service demand of about 0.50 millisecond (ms) and the critical section CS2 of class 2 may have service demand of about 1.9 ms. Because the critical section of class 2 has higher demand, it may reach saturation earlier at 500 users while critical section CS1 of class 1 may continue to have higher throughput until 1200 users. As shown in FIG. 7, in a multi-class scenario, the system 102 may be able to predict the throughput for individual classes and the overall CPU utilization. However, the predicted throughput and predicted utilization for class 2 may be, for example, about 10% higher than the actual throughput and actual utilization. The differences may be due to the higher service demand estimated using a timer routine around a critical section. The system 102 may attribute to the higher service demand computed for critical sections. The service demand may be obtained through instrumentation of program code corresponding to the synchronization block. The one or more modules may capture start-time and end-time of synchronization block to obtain the service demand.

Figure 8:
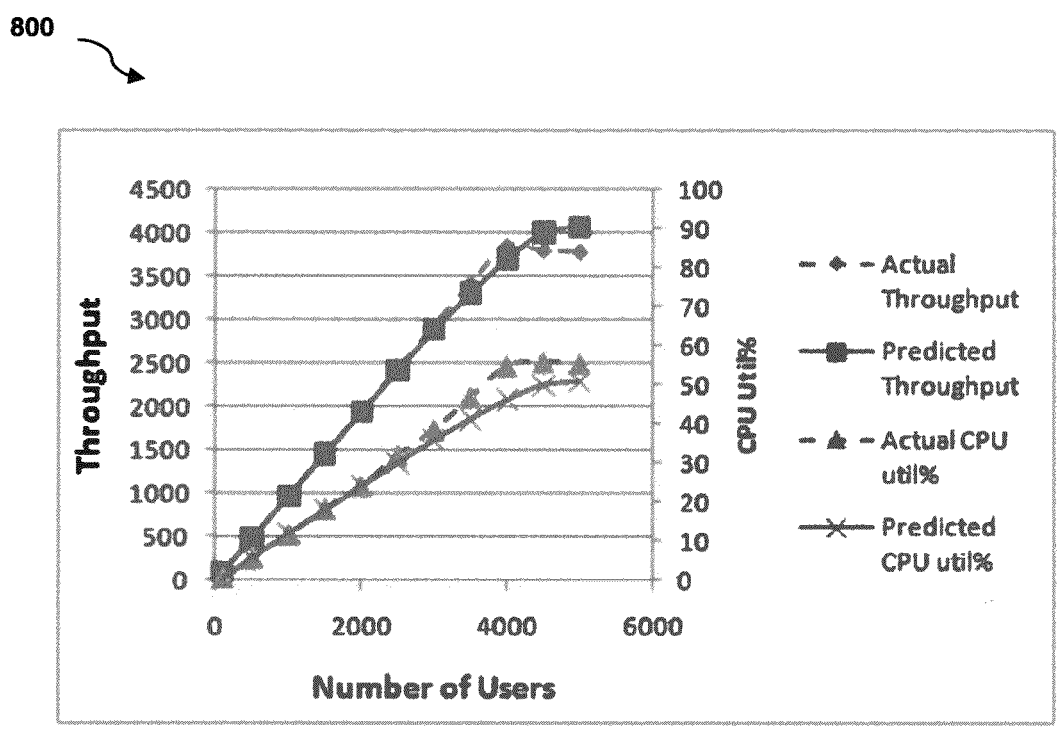
FIG. 8 is a diagram illustrating exemplary performance metrics for resource pooling, in accordance with an exemplary embodiment of the present subject matter.

As another non-limiting example, FIG. 8 is a diagram 800 illustrating performance prediction of the multi-threaded application where critical sections have resource pooling. In this example, the resource pool size of 50 and 100 are used and the number of users is varied. The service demand for resource pooling may be taken as 13 ms, which may be relatively higher compared to some earlier experiments. This is to restrict the number of users to which the application scales up.

FIG. 8 shows the total throughput of the entire resource pooling and the per-core CPU utilization as the number of users is varied on a mid-range server. As shown in FIG. 8, the predicted throughput and the predicted CPU utilization may provide an indication of the respective actual values. Due to multiple resources in the pool, the throughput may be higher in this case and the application may also scale to a higher number of users.

FIG. 3 illustrates an exemplary method 300 for predicting performance of a multi-threaded application in the presence of resource bottlenecks, in accordance with an embodiment of the present subject matter. The order in which the method 300 is described is not intended to be construed as a limitation, and any number of the described method blocks may be combined in any order to implement the method 300 or any alternate methods. Additionally, individual blocks may be deleted from the method 300 without departing from the spirit and scope of the subject matter described herein. Furthermore, the method may be implemented in any suitable hardware, software, firmware, or combination thereof. For ease of explanation, however, in the embodiments described below, the method 300 may be considered to be implemented in the above described system 102.

As shown in FIG. 3, one or more queuing networks may be represented for resources employed to run the multi-threaded application to detect a concurrency level at which resource bottlenecks are encountered while accessing the multi-threaded software application (step 302). Performance metrics may be computed for the multi-threaded software application (step 304). The performance metrics may include one or more parameters. The system may use an iterative technology with a pre-determined value of service demand to identify a relationship between the software queuing network and the hardware queuing network (step 306). Values of the one or more parameters may be determined in a form of a throughput value and a response time value for the multi-threaded software application (step 308). Based on the one or more parameters, the system may determine the performance of the multi-threaded software application.

The written description describes the subject matter herein to enable any person skilled in the art to make and use the embodiments of the present disclosure. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A system for predicting performance of a multi-threaded software application in the presence of resource bottlenecks, the system comprising:
   one or more processors; and
   a memory staring processor-executable instructions comprising instructions that, when executed by the one or more processors, configure the one or more processors to:
   represent one or more queuing networks corresponding to resources, the resources being employed to run the multi-threaded software application, wherein the resources comprise hardware resources and software resources, wherein the one or more queuing networks represent contention for resources, and wherein the one or more queuing networks correspond to at least one of a hardware queuing network of a software queuing network;
   identify a relationship between the software queuing network and the hardware queuing network based on at least one of a predetermined service demand, the software queuing network, and the hardware queuing being associated with the represented one or more queuing networks, wherein the relationship comprises at least one of utilization and sharing of the software resources with respect to the hardware resources and with respect to a predetermined value of the predetermined service demand, wherein the instructions to identify the relationship between the software queuing network and the hardware queuing network based on the predetermined service demand further comprises instructions to:

obtain one or more blocked threads associated with a critical section based on the predetermined service demand, the blocked threads being retained to provide comparison with iterative blocked threads, wherein the number of blocked threads at the critical section is the number of threads awaiting to enter the critical section;

obtain a residence time at each of the hardware resources based on the predetermined service demand;

update based on the residence time, a critical section service demand to reflect a waiting time for the hardware resources; and compare the one or more blocked threads with the iterative blocked threads and the residence time;

detect, based on the one or more queuing networks, a concurrency level associated with encountering of a first resource bottleneck, wherein the concurrency level is detected by checking a number of threads accessing the multi-threaded software application;

determine, based on the concurrency level, a plurality of performance metrics associated with the multi-threaded software application; and predict the performance of the multi-threaded software application based on the plurality of performance metrics.

2. The system of claim 1, wherein the software resources comprise one or more software modules and wherein the hardware resources comprise at least one of a CPU (Central Processing Unit), a memory, and a disk.

3. The system of claim 1, wherein the hardware queuing network represents the hardware resources and wherein the software queuing network represents one or more software modules corresponding to at least one of critical sections and non-critical sections, the critical sections corresponding to a single shared resource and the non-critical sections corresponding to a portion of the processor-executable instructions executable by a plurality of users.

4. The system of claim 1, wherein the first resource bottleneck is associated with a plurality of resource bottlenecks corresponding to at least one of software bottlenecks, hardware bottlenecks, and bottlenecks associated with at least one of a thread pool, a database connection pool, sockets, and locks on a data item.

5. The system of claim 1 wherein the predetermined service demand comprises at least one of: a service demand of the hardware resources at each of a plurality of tiers of the multi-threaded software application and a service demand of synchronization events.

6. The system of claim 1, wherein the instructions to identify the relationship between the software queuing network and the hardware queuing network based on the predetermined service demand further comprise instructions to:

determine whether the updated critical section service demand is lower than an initial critical section service demand;

determine whether a difference between a number of the one or more blocked threads corresponding to the initial critical section demand and a number of the one or more blocked threads corresponding to the updated critical section demand;

repeat the solving of the software queuing network and the solving of the hardware queuing network when the difference is greater than or equal to a predefined value; and obtain the performance metrics based on the updated critical section service demand when the difference is less than the predefined value, the predefined value indicating stabilizing or converging of an error associated with the number of the one or more blocked threads with respect to a plurality of iterations.

7. The system of claim 1, wherein the performance metrics include one or more parameters, the one or more parameters comprising at least one of: an average CPU (Central Processing Unit) utilization per core associated with an estimated throughput and a total CPU service demand.

8. The system of claim 1, wherein the performance metrics comprises one or more parameters, the one or more parameters including at least one of a throughput value and a response time value associated with the multi-threaded software application.

9. A method for predicting performance of a multi-threaded software application in the presence of resource bottlenecks, the method comprising:

representing one or more queuing networks corresponding to resources, the resources being employed to run the multi-threaded software application, wherein the resources comprise hardware resources and software resources, wherein the one or more queuing networks represent contention for the resources, and wherein the one or more queuing networks correspond to at least one of a hardware queuing network or a software queuing network;

identifying a relationship between a software queuing network and a hardware queuing network based on at least one of a predetermined service demand, the software queuing network, and the hardware queuing network being associated with the represented one or more queuing networks, wherein the relationship comprises at least one of utilization and sharing of the software resources with respect to the hardware resources and with respect to a predetermined value of the predetermined service demand, wherein identifying the relationship between the software queuing network and the hardware queuing network based on the predetermined service demand further comprises:

obtaining one or more blocked threads associated with a critical section based on the predetermined service demand, the blocked threads being retained to provide comparison with iterative blocked threads, wherein the number of blocked threads at the critical section is the number of threads awaiting to enter the critical section;

obtaining a residence time at each of the hardware resources based on the predetermined service demand;

updating, based on a residence time, a critical section service demand to reflect a waiting time for the hardware resources; and comparing the one or more blocked threads with the iterative blocked threads and the residence time;

detecting, by one or more processors and based on the one or more queuing networks, a concurrency level associated with encountering of a first resource bottleneck, wherein the concurrency level is detected by checking a number of threads accessing the multi-threaded software application;

determining, by one or more processors and based on the concurrency level, a plurality of performance metrics associated with the multi-threaded software application; and predicting, by the one or more processors, the performance of the multi-threaded software application based on the plurality of performance metrics.

10. The method of claim 9, wherein the hardware queuing network represents hardware resources and wherein the software queuing network represents one or more software modules corresponding to at least one of critical sections and non-critical sections, the critical sections corresponding to a single shared resource and the non-critical sections corresponding to a portion of the processor-executable instructions executable by a plurality of users.

11. The method of claim 9 wherein the first resource bottleneck is associated with a plurality of resource bottlenecks corresponding to at least one of software bottlenecks, hardware bottlenecks, and bottlenecks associated with at least one of a thread pool, a database connection pool, sockets, and locks on a data item.

12. The method of claim 9, wherein the predetermined service demand comprises at least one of: a service demand of the hardware resources at each of a plurality of tiers of the multi-threaded software application and a service demand of synchronization events.

13. The method of claim 9, wherein identifying the relationship between the software queuing network and the hardware queuing network based on the predetermined service demand further comprises:
- determining whether the updated critical section service demand is lower than an initial critical section service demand;
- determining whether a difference between a number of the one or more blocked threads corresponding to the initial critical section demand and a number of the one or more blocked threads corresponding to the updated critical section demand;
- repeating the solving of the software queuing network and the solving of the hardware queuing network when the difference is greater than or equal to a predefined value; and
- obtaining the performance metrics based on the updated critical section service demand when the difference is less than the predefined value, the predefined value indicating stabilizing or converging of an error associated with the number of the one or more blocked threads with respect to a plurality of iterations.

* * * * *